United States Patent
Ram et al.

(10) Patent No.: US 7,876,673 B2
(45) Date of Patent: Jan. 25, 2011

(54) PREVENTION OF FRAME DUPLICATION IN INTERCONNECTED RING NETWORKS

(75) Inventors: Rafi Ram, Herzliya (IL); Leon Bruckman, Petah Tikva (IL); Ronen Solomon, Givatayim (IL); Gideon Agmon, Kfar-Sava (IL)

(73) Assignee: Corrigent Systems Ltd., Tel Aviv (IL)

( * ) Notice: Subject to any disclaimer, the term of this patent is extended or adjusted under 35 U.S.C. 154(b) by 319 days.

(21) Appl. No.: 12/044,158

(22) Filed: Mar. 7, 2008

(65) Prior Publication Data

US 2008/0222447 A1 Sep. 11, 2008

Related U.S. Application Data

(60) Provisional application No. 60/906,090, filed on Mar. 8, 2007.

(51) Int. Cl.
*H04J 1/16* (2006.01)
*H04L 12/28* (2006.01)

(52) U.S. Cl. ............... 370/222; 370/389; 370/404
(58) Field of Classification Search ........... 370/386, 370/216, 224, 232, 401
See application file for complete search history.

(56) References Cited

U.S. PATENT DOCUMENTS

| | | | |
|---|---|---|---|
| 6,807,172 B1 | 10/2004 | Levenson et al. | |
| 6,829,651 B1 | 12/2004 | Bass et al. | |
| 6,963,575 B1 * | 11/2005 | Sistanizadeh et al. | ....... 370/404 |
| 7,009,974 B1 | 3/2006 | Fotedar | |
| 7,619,987 B2 * | 11/2009 | Mitsumori | ........... 370/254 |
| 2004/0165525 A1 | 8/2004 | Burak | |
| 2006/0059325 A1 | 3/2006 | Milne et al. | |
| 2006/0109802 A1 | 5/2006 | Zelig et al. | |
| 2008/0107125 A1 | 5/2008 | Bruckman | |

OTHER PUBLICATIONS

The IEEE Standard 802.17, entitled: "Part 17: Resilient Packet Ring (RPR) Access Method & Physical Layer Specifications", 2007.
Ram, "Protected Inter-Ring Connection", Proceedings of the IEEE 802.17 RPR Working Group interim Working Srsssion, Jan. 2008.
Marc Lasserre, et al., "Virtual Private LAN Services OVer MPLS", Feb. 2005.
K. Kompella, et al., "Virtual Private LAN Service", Dec. 2005.

* cited by examiner

*Primary Examiner*—Melanie Jagannathan
(74) *Attorney, Agent, or Firm*—Fish & Richardson P.C.

(57) ABSTRACT

A method for communication includes, in a communication network that includes multiple ring nodes arranged in at least first and second ring networks that are connected by two or more of the ring nodes serving as interconnect nodes, accepting at the two or more interconnect nodes respective copies of a data packet, which is sent from a source user node connected to the first ring network.

An attribute is extracted from the respective copies of the data packet at each of the interconnect nodes, and a predefined mapping function is applied to the extracted attribute so as to select a single interconnect node for forwarding the data packet to the second ring network. A single copy of the data packet is forwarded to the second ring network only from the selected interconnect node, while refraining from forwarding other copies from the other interconnect nodes.

35 Claims, 3 Drawing Sheets

FIG. 1

PREVENTION OF FRAME DUPLICATION IN INTERCONNECTED RING NETWORKS

CROSS-REFERENCE TO RELATED APPLICATIONS

This application claims the benefit of U.S. Provisional Patent Application 60/906,090, filed Mar. 8, 2007, whose disclosure is incorporated herein by reference.

FIELD OF THE INVENTION

The present invention relates generally to communication networks, and particularly to methods and systems for communicating over interconnected networks.

BACKGROUND OF THE INVENTION

Communication networks sometimes employ ring configurations. For example, some networks comprise Resilient Packet Ring (RPR) configurations, as defined by the IEEE standard 802.17, entitled "Part 17: Resilient Packet Ring (RPR) Access Method & Physical Layer Specifications," which is incorporated herein by reference.

In some network configurations, two or more ring networks are interconnected to one another. For example, two Synchronous Optical Network (SONET) Bidirectional Linear Switched Ring (BLSR) rings may be connected in a configuration known as Dual Ring Interconnect (DRI).

SUMMARY OF THE INVENTION

Embodiments of the present invention provide a method for communication, including:

in a communication network that includes multiple ring nodes arranged in at least first and second ring networks, which are connected by two or more of the ring nodes serving as interconnect nodes, accepting at the two or more interconnect nodes respective copies of a data packet, which is sent from a source user node connected to the first ring network;

extracting an attribute from the respective copies of the data packet at each of the interconnect nodes, and applying a predefined mapping function to the extracted attribute so as to select a single interconnect node for forwarding the data packet to the second ring network; and forwarding a single copy of the data packet to the second ring network only from the selected interconnect node, while refraining from forwarding other copies from the other interconnect nodes.

In some embodiments, the first and second ring networks conform to a Resilient Packet Ring (RPR) standard. In an embodiment, the data packet includes a flooded packet, and forwarding the single copy to the second ring network includes causing the ring nodes of the second ring network to flood the data packet over the second ring network. In another embodiment, the data packet includes a ring-level destination address indicating that the data packet is addressed to multiple recipients. In a disclosed embodiment, the attribute includes a Virtual Local Area Network (VLAN) identifier. Additionally or alternatively, the attribute includes a Quality-of-Service (QoS) attribute.

The mapping function may include a hashing function. In some embodiments, the mapping function and the attribute are defined such that a first data packet originating from a first end user and destined to a second end user and a second data packet originating from the second end user and destined to the first end user are forwarded by the same interconnect node. Additionally or alternatively, the mapping function and the attribute may be defined such that data packets associated with a given conversation are forwarded by the same interconnect node.

In an embodiment, the respective copy of the data packet is forwarded from a first interconnect node irrespective of the mapping function responsively to an event that prevents a second interconnect node from forwarding the copy. In a disclosed embodiment, responsively to a recovery of the second interconnect node from the event, forwarding of copies from the first interconnect node is re-initiated in accordance with the mapping function. In some embodiments, communication messages are exchanged between the first and second interconnect nodes so as to detect the event and the recovery. In another embodiment, the method includes waiting a predetermined time-out period following the recovery before re-initiating forwarding of the copies in accordance with the mapping function.

In yet another embodiment, the method includes detecting by the interconnect nodes a topology change in the first ring network, and notifying the topology change to the ring nodes in the second ring network by the interconnect nodes. In still another embodiment, the method includes operating each node among the interconnect nodes in one of multiple forwarding states including at least a first state in which the node forwards data packets selectively in accordance with the mapping function, a second state in which the node forwards the data packets irrespective of the mapping function, and a third state in which the node refrains from forwarding the data packets. Operating the node may include applying a set of rules, which depend on the forwarding states, to the accepted copy of the data packet so as to determine whether to forward the copy.

In some embodiments, the method includes refraining from forwarding the accepted copy from a given interconnect node responsively to determining that the data packet originates from a local user node, which is locally-connected to another interconnect node and is not connected to the first or second ring networks.

There is additionally provided, in accordance with an embodiment of the present invention, a communication apparatus used in a communication network that includes multiple ring nodes arranged in at least first and second ring networks, the apparatus including two or more interconnect nodes that connect the first and second ring networks, wherein the interconnect nodes are configured to accept respective copies of a data packet, which is sent from a source user node connected to the first ring network, to extract an attribute from the respective copies of the data packet, to apply a predefined mapping function to the extracted attribute so as to select a single interconnect node for forwarding the data packet to the second ring network, and to forward a single copy of the data packet to the second ring network only from the selected interconnect node, while refraining from forwarding other copies from the other interconnect nodes.

There is further provided, in accordance with an embodiment of the present invention, a communication network including multiple ring nodes arranged in at least first and second ring networks, the multiple ring nodes including two or more interconnect nodes that connect the first and second ring networks, wherein the interconnect nodes are configured to accept respective copies of a data packet, which is sent from a source user node connected to the first ring network, to extract an attribute from the respective copies of the data packet, to apply a predefined mapping function to the extracted attribute so as to select a single interconnect node for forwarding the data packet to the second ring network, and to forward a single copy of the data packet to the second ring network only from the selected interconnect node, while refraining from forwarding other copies from the other interconnect nodes.

The present invention will be more fully understood from the following detailed description of the embodiments thereof, taken together with the drawings in which:

DETAILED DESCRIPTION OF EMBODIMENTS

Overview

Some network configurations comprise interconnected rings, i.e., two or more ring networks that are connected to one another. Interconnected ring configurations are useful, for example, for connecting a local network to a metropolitan or wide-area network, and in various other applications.

Embodiments of the present invention provide improved methods and systems for interconnecting ring networks and for communicating over interconnected rings. In some embodiments that are described hereinbelow, each ring network comprises multiple ring nodes, which provide communication services to user nodes. Interconnection between the rings is carried out by two or more of the ring nodes, which belong to both rings and serve as interconnect nodes. The interconnect nodes are active simultaneously and forward data packets between the two rings. The simultaneous use of multiple interconnect nodes provides a high degree of resilience, since it prevents a single point of failure from disconnecting the rings.

When two or more interconnect nodes are active simultaneously, however, a prime consideration is the prevention of frame duplication and formation of traffic loops. Prevention of frame duplication is particularly important for flooded packets, i.e., packets that are sent to unrecognized Media Access Control (MAC) addresses. A flooded packet may cause a traffic loop when more than one interconnect node forwards the packet between rings.

The methods and systems described herein prevent frame duplication by ensuring that only a single interconnect node will forward a given flooded packet. In some embodiments, the interconnect nodes are provided with a predefined mapping function, which selects a single interconnect node for forwarding a given packet based on one or more packet attributes. When a data packet is flooded across one of the rings, the interconnect nodes receive respective copies of the packet. Each node extracts the packet attributes and evaluates the mapping function. Only the interconnect node that is selected by the mapping function forwards its copy of the packet to the other ring. The other interconnect nodes discard their copies of the packet.

Various types of mapping functions and packet attributes can be used. Typically, the attributes are chosen so that data packets associated with a given conversation or flow are forwarded by the same interconnect node. For example, a suitable attribute may comprise a Virtual Local Area Network (VLAN) tag of the packet. In some embodiments, the mapping function and/or attributes are chosen so as to divide the traffic load among the different interconnect nodes, thus providing a certain degree of load balancing.

Although the embodiments described herein mainly address flooded packets, the principles of the present invention can also be used for forwarding multicast packets, broadcast packets and other types of packets that are addressed to multiple recipients at the ring level.

In some embodiments, the interconnect nodes modify their operation in response to different failure and failure recovery scenarios, as well as in response to network topology changes. Several exemplary scenarios are explained and demonstrated below.

In summary, the methods and systems described herein provide means for interconnecting ring networks in a manner that prevents single points of failure, prevents frame duplication, and provides load balancing of the forwarded traffic.

System Description

Figure 1:
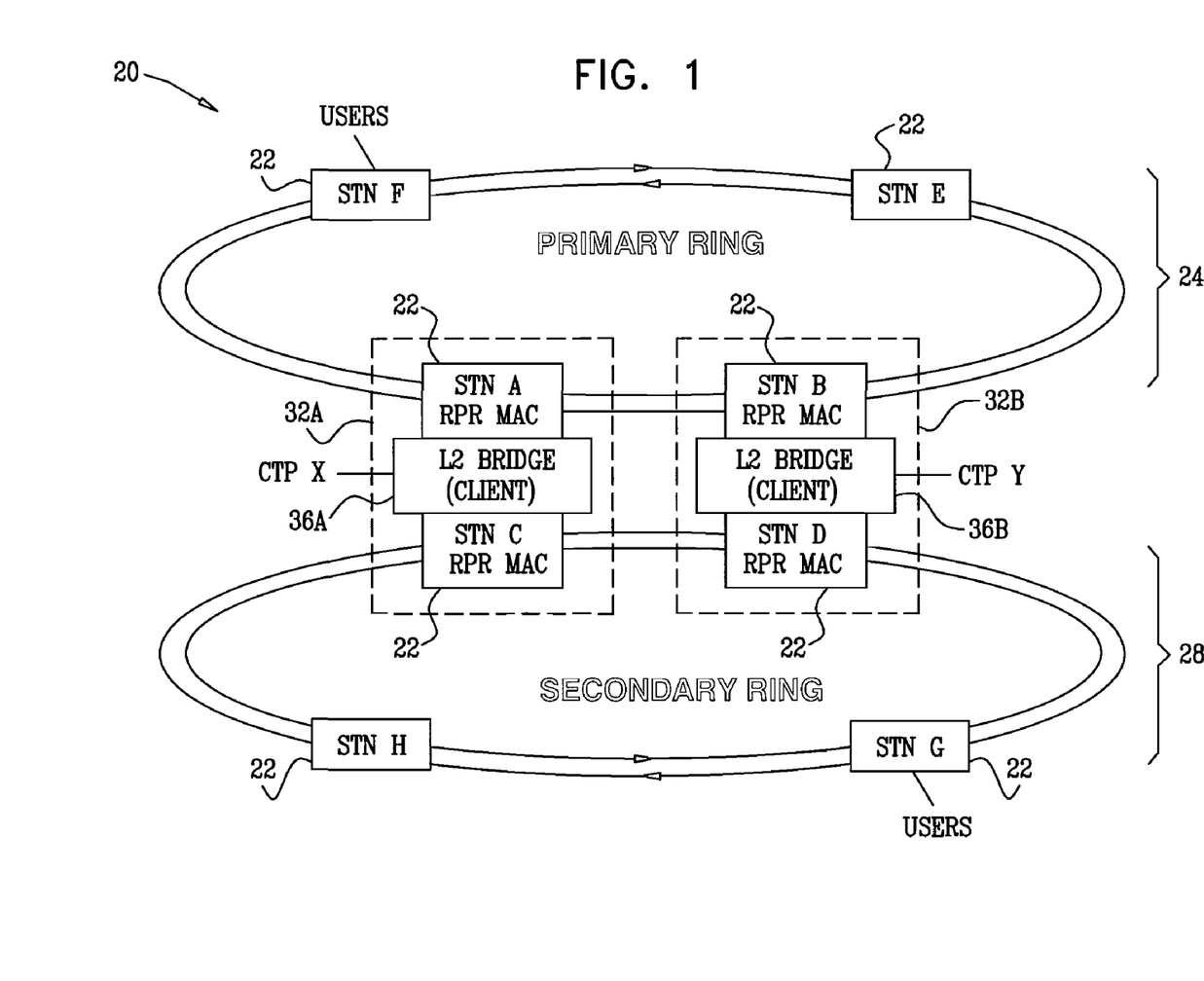
FIG. 1 is a block diagram that schematically illustrates a communication network, in accordance with an embodiment of the present invention.

FIG. 1 is a block diagram that schematically illustrates a packet-switched communication network 20, in accordance with an embodiment of the present invention. Network 20 comprises multiple network elements 22, also referred to as network nodes, which provide communication services to user nodes. Nodes 22 are arranged in two ring networks 24 and 28, which are interconnected to one another. Each ring network may comprise, for example, a bidirectional RPR operating in accordance with the IEEE 802.17 standard, cited above. Interconnected ring configurations are useful, for example, in connecting a local network to a metropolitan or wide-area network, as well as in various other scenarios. In the description that follows, nodes 22 are also referred to as ring nodes, and the user nodes are also referred to as Connection termination Points (CTPs).

Each ring node that belongs to a certain ring typically comprises a ring station (STN), which provides an interface to the ring. Some network elements, as will be shown below, may comprise two or more stations, which connect to two or more rings.

Interconnection of rings 24 and 28 is carried out by two of the ring nodes, which serve as interconnect nodes 32A and 32B. The interconnect nodes forward data packets or frames from one ring to the other using methods that are described in detail below. Network 20 deploys two interconnect nodes in order to prevent a single point of failure, i.e., to prevent any single failure from disconnecting the two rings. Additionally, as will be shown below, the two interconnect nodes operate concurrently and divide the inter-ring traffic between them, thus achieving load balancing.

Although the exemplary configuration of network 20 comprises two interconnect nodes (a configuration that is commonly referred to as "dual homing"), this configuration was chosen purely for the sake of conceptual clarity. In alternative embodiments, the rings can be interconnected by a higher number of interconnect nodes, in a configuration that is sometimes referred to as "multi-homing." The methods and systems described herein can be generalized in a straightforward manner to the case of more than two interconnect nodes. In some embodiments, one of the ring networks is referred to as a primary network and the other is referred to as a secondary network. Forwarding from the primary to the secondary network and in the opposite direction may sometimes follow different rules, as will be explained below.

In some embodiments, an interconnect node may have users that are connected directly to the interconnect node and are not members of any of the rings. In the example of FIG. 1, a local user denoted CTP X is connected to interconnect nodes 32A. Another local user, denoted CTP Y, is connected to interconnect node 32B.

Each interconnect node comprises two stations 22, one belonging to each ring network. Each interconnect node further comprises a layer 2 (L2) Ethernet bridge 36, also referred to as a client, which carries out packet filtering and forwarding between the two stations of the interconnect nodes. In the present example, nodes 32A and 32B comprise L2 bridges 36A and 36B, respectively. When the interconnect node supports local CTPs, the L2 bridge forwards traffic to and from the local CTPs, as well.

In some embodiments, the two stations and the L2 bridge of a given interconnect node are collocated and are typically packaged in a single unit. Alternatively, the two stations of an interconnect node may be geographically separate units, which are connected to one another by a suitable back-to-back interface. The L2 bridge of such an interconnect node may reside adjacently to any of the two stations, or in a separate unit.

The two stations of a given interconnect node (e.g., STN A and STN C of node 32A) are referred to herein as peer stations. The stations in a given ring that belong to the different interconnect nodes (e.g., STN A and STN B of ring 24) are referred to herein as mate stations.

The two or more interconnect nodes that connect a given pair of rings are sometimes referred to as a protection group. The interconnect nodes belonging to a given protection group typically communicate with one another, for example in order to coordinate their operation under failure and failure recovery scenarios. Several exemplary scenarios are discussed in the description of FIG. 3 below. Although the description that follows refers to a single protection group that interconnects a pair of rings, the methods and systems described herein can be used in higher complexity networks comprising more than two rings and more than one protection group.

Frame Duplication and Flooding

When two rings are connected by multiple interconnect nodes, one of the prime consideration is to prevent frame duplication and formation of traffic loops in the network. Frame duplication may occur when two or more interconnect nodes forward copies of the same packet from one ring to the other, causing a certain network node to receive multiple copies of the packet. Prevention of frame duplication is particularly important in packets that are duplicated at the RPR level, such as flooded packets, multicast packets and broadcast packets.

For example, when a certain user node (source node) communicates with another user node (destination node), the packets addressed to the Media Access Control (MAC) address of the destination node should be forwarded to the ring node that serves the destination node. In RPR networks, the ring nodes typically maintain forwarding databases (FDB, also referred to as MAC tables), which associate destination MAC addresses to ports. In RPR networks, the MAC tables also associate destination MAC addresses to the appropriate remote station, i.e., the ring station via which the packet is to exit the ring. Each MAC table entry specifies the port over which a packet addressed to a given MAC address is to be forwarded. In the RPR case, the table entry also specifies the RPR Destination Address (DA). The nodes forward incoming packets in accordance with their MAC tables, so that each packet ultimately reaches the ring node that serves the node having the destination MAC address.

In some cases, however, the MAC tables of ring nodes 22 may not have information regarding the association of the destination MAC address of a given packet. In such a case, the ring nodes carry out a process that is commonly known as flooding. When a ring node receives a packet whose destination MAC address does not appear in its MAC table, it forwards duplicate copies of the packet over all of its ports, except for the port over which the packet was received. As a result, the packet is "flooded" across the network and ultimately reaches the destination node at least once. The destination node replies by sending a response packet. When a certain ring node receives a packet, it learns the port over which the packet arrived (and the source RPR station, if applicable) and updates its MAC table accordingly. This process is commonly known as MAC learning.

Prevention of Frame Duplication

In order to prevent traffic loops, it is important that only one interconnect node forwards flooded packets from one ring to the other. The methods and systems described herein ensure that even though multiple interconnect nodes are active simultaneously, only one of them will forward a given flooded packet. Although the embodiments described herein mainly address flooded packets, the methods and systems described herein can be used to prevent frame duplication and traffic loops in other types of packets whose RPR-level destination address in not unicast, i.e., packets whose ring-level destination address indicates that they are addressed to multiple recipients. Such packets may comprise, for example, multicast and broadcast packets.

In order to determine which interconnect node is to forward a given packet, the interconnect nodes evaluate a predefined mapping function that operates on attributes of the packet. All interconnect nodes in a given protection group are provided with the same mapping function. When receiving a flooded packet, each interconnect node evaluates the function with respect to the attributes of the received packet. The function produces an indication whether the interconnect node is to forward or discard the packet. For example, the function may produce an index of the single interconnect node that is to forward the packet. An interconnect node whose index matches the value produced by the function will forward the packet. The other interconnect nodes will discard the packet.

The mapping function is typically defined so as to meet three conditions:

1. For a given packet, the mapping function uniquely determines a single interconnect node. This condition ensures that, although each interconnect node evaluates the function individually, exactly one interconnect node will forward any given flooded packet.
2. The function is symmetric. In other words, packets originating from end user A and destined to end user B will be mapped to (i.e., forwarded by) the same interconnect node as packets originating from end user B and destined to end user A. This condition is important in order not to interfere with the MAC learning process.
3. Different packets that belong to a certain conversation or flow will be mapped to (i.e., forwarded by) the same interconnect node. For example, in a certain conversation, the unicast packets that follow an Address Resolution Protocol (ARP) packet are to be forwarded by the same interconnect node.

Any suitable mapping function can be used, as long as the three conditions above are met. For example, the mapping function may comprise a suitable hashing function that operates on one or more packet attributes and produces an index of the desired interconnect node. In some embodiments, the mapping function divides the traffic load among the different interconnect nodes, so as to achieve a certain degree of load balancing.

In some embodiments, the indices of the interconnect nodes can be determined individually by the interconnect nodes themselves, without a need for a-priori provisioning. For example, in some embodiments, the station on the secondary ring having the lower MAC address is assigned an index "0" and the station having the higher MAC address is assigned an index "1".

Any suitable packet attribute may be used as input to the mapping function, as long as the three conditions above are met. The packet attributes are typically extracted from the packet header. For example, in some embodiments, each packet is associated with a certain Virtual Local Area Network (VLAN), and packets belonging to a given conversation are associated with the same VLAN. In these embodiments, the mapping function may operate on the VLAN identifier (VLAN ID) of the VLAN tag in the packet header. Forwarding of the different VLANs used in the network is divided between the interconnect nodes, thus balancing the traffic load between them.

For example, the mapping function may determine whether the number of "1" bits in the VLAN tag of the packet is odd or even (e.g., by performing a XOR operation on the bits of the VLAN tag). If the number of "1" bit is even, the packet will be forwarded by the interconnect node whose index is "0". If the number of "1" bit is odd, the packet will be forwarded by the interconnect node whose index is "1".

Alternatively, the mapping function may operate on Quality-of-Service (QoS) attributes such as a Class-of-Service (CoS) of the packet, and/or on any other suitable attribute or set of attributes.

Figure 2:
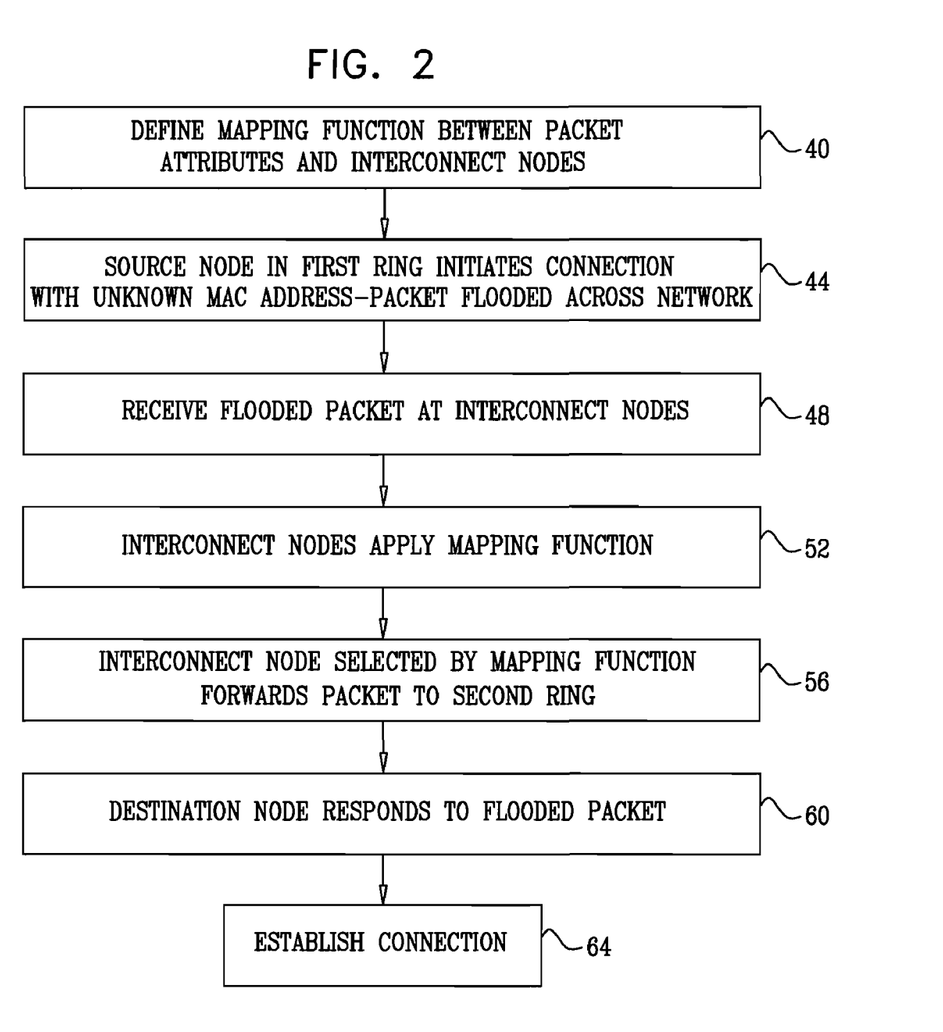
FIGS. 2 and 3 are flow charts that schematically illustrate methods for communicating over interconnected ring networks, in accordance with embodiments of the present invention.

FIG. 2 is a flow chart that schematically illustrates a method for communicating over network 20, in accordance with an embodiment of the present invention. The method begins by predefining a mapping function that maps packet attributes to interconnect nodes, at a mapping definition step 40. For any given value or values of the packet attributes, the function specifies one of interconnect nodes 32A and 32B. The function is provided to the two interconnect nodes.

At a certain point in time, a user node (referred to as a source node) in one of the rings sends a packet whose destination MAC address is not recognized by the ring nodes, at an unrecognized packet transmission step 44. In the present example, the source node attempts to establish communication with a destination node that is served by the second ring. Since the destination MAC address is unknown to the ring nodes, the packet is flooded across the network, as described above. In particular, interconnect nodes 32A and 32B receive duplicate copies of the flooded packet, at a duplicate reception step 48.

Each of the two interconnect nodes individually extracts the packet attributes from the received flooded packet and evaluates the mapping function, at a mapping step 52. As a result, one of the interconnect nodes concludes that it is requested to forward the packet to the other ring, whereas the other interconnect node concludes that it is to discard the packet. Only the interconnect node indicated by the mapping function forwards the packet to the other ring, at a selective forwarding step 56. The other interconnect node discards the packet. The flooded packet is thus forwarded only once to the second ring.

The flooded packet that was forwarded by the selected interconnect node reaches the destination node. The destination node typically responds to the flooded packet with a response packet, at a response step 60. Connection between the source and destination nodes is then established, at a connection establishing step 64. The relevant ring nodes in the two rings update their MAC tables based on the response packet, so that subsequent packets sent to the destination node are recognized by the ring nodes and can be forwarded accordingly. Connection establishment is enabled by the MAC learning process described above.

Although the description above refers to flooded unicast packets that are addressed to unrecognized MAC addresses, the methods and systems described herein can be used with other packet types, such as multicast and broadcast packets. Some of these cases are not necessarily associated with connection establishment, and therefore connection establishment step 64 can sometimes be omitted.

Failure and Failure Recovery Scenarios

The simultaneous use of multiple interconnect nodes protects network 20 against failures. When the network operates normally, both interconnect nodes forward flooded packets selectively, in accordance with the mapping function. In some failure scenarios, however, one of the interconnect nodes is prevented from forwarding packets. Such scenarios may occur, for example, when the node has failed, because a loss of network connectivity prevents it from receiving packets, or in response to operator management commands. In these cases, the other interconnect node should forward all flooded packets, irrespective of the mapping function. In multi-homing configurations (when the two rings are interconnected by more than two interconnect nodes), the functional interconnect nodes should distribute the traffic originally handled by the non-functional interconnect node between them. In other scenarios, such as when ring connectivity is broken and there is no risk of frame duplication, it may be advantageous for both interconnect nodes to forward all flooded packets. The forwarding logic of the interconnect nodes may also change in response to recovery from network failures.

Figure 3:
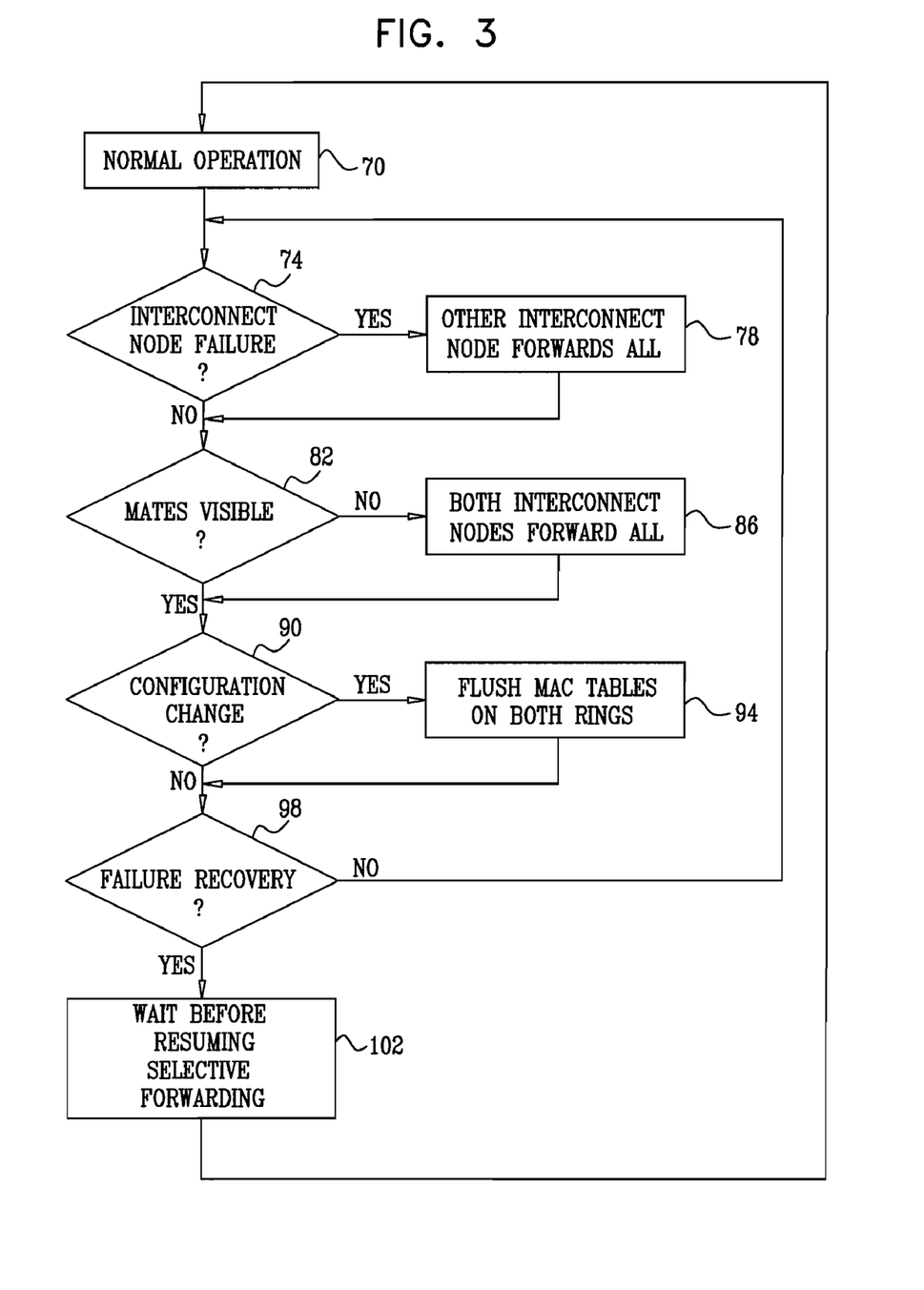

FIG. 3 is a flow chart that schematically illustrates a method for communicating over interconnected ring networks, in accordance with an embodiment of the present invention. FIG. 3 demonstrates the concept of operating multiple interconnect nodes under different failure and failure recovery scenarios, in the exemplary case of two interconnect nodes. The flow shown in FIG. 3 is presented purely as an example, and various other types of failure handling logic can be used in alternative embodiments.

The method of FIG. 3 is presented from the point of view of the entire network, and not necessarily from the point of view of a particular interconnect node or station. This sort of network operation can be implemented by defining various operational states for the interconnect nodes and their stations. An exemplary set of operational states is described further below. The operation of interconnect nodes and their stations is addressed in greater detail by Ram in "Protected Inter-Ring Connection," Proceedings of the IEEE 802.17 RPR working group interim working session, January, 2008, which is incorporated herein by reference.

The method of FIG. 3 begins with network 20 operating normally, at a normal operation step 70. When operating normally, each interconnect node forwards flooded packets selectively, in accordance with the mapping function. When a given interconnect node is prevented from forwarding packets (e.g., because of failure or operator command), as checked by a node failure checking step 74, the other interconnect node begins to forward all flooded packets regardless of the mapping function, at a forward all step 78. In some embodiments, the interconnect nodes may exchange synchronization messages with one another, so that each interconnect node is able to determine that the other interconnect node has failed. When a given interconnect node determines that the other interconnect node failed, it begins to forward all flooded packets, thus protecting the traffic handled by the failed node.

In some failure scenarios, the connectivity of a given ring is disrupted so that the mate stations on the ring cannot communicate with one another. The interconnect nodes may determine such scenarios, for example, by exchanging synchronization messages between mate stations. Alternatively, the interconnect nodes may detect ring disruption from the RPR topology database constructed by the RPR control mechanisms. When the mate stations are invisible to one another, as checked at a mate visible checking step 82, both interconnect nodes begin to forward all flooded packets regardless of the mapping function, at a non-selective forwarding step 86. Since in this scenario a given flooded packet can reach only one of the interconnect nodes, there is no danger of causing traffic loops.

The interconnect nodes check for network configuration (topology) changes, at a change detection step 90. Topology changes may comprise, for example, protection events, i.e., failures or failure recoveries that cause a change in the operation of the interconnect nodes.

The RPR standard defines a mechanism in which the ring nodes flush their MAC tables following a change of network topology, so as to restart the MAC learning process and adapt to the new topology. However, when the ring whose topology has changed (referred to as the local ring) is connected to another ring (referred to as the remote ring), the change should be propagated to the ring nodes of the remote ring, as well.

Therefore, in some embodiments of the present invention, when an interconnect node detects a topology change in one ring, as checked at a change detection step 90, the interconnect node advertises the change on the other ring too, at a remote ring advertising step 94. The ring nodes of the remote ring flush their MAC tables in response to the advertised change, at a table flushing step 94. Typically, the ring nodes flush only the relevant part of the MAC table. For example, when the topology change pertains to a certain node, the ring nodes of both the local and remote rings delete only the MAC table entries that are associated with this node.

When recovering from failure, the interconnect nodes transition from a situation in which one node forwards all flooded packets and the other does not forward any packets, to a situation in which both interconnect nodes forward flooded packets selectively based on the mapping function. During the transition, flooded packets may be undesirably forwarded by both interconnect nodes, such as when the recovered interconnect node begins selective forwarding while the other node is still forwarding all packets. Another problematic scenario occurs when packets that were already forwarded by the protecting interconnect node are still traveling through the ring while the recovered interconnect node resumes operation. When these packets reach the recovered interconnect node, it will send them back to the original ring, thus creating packet duplication.

Therefore, in some embodiments, the interconnect nodes detect a failure recovery scenario, at a recovery detection step 98. Upon recovering from failure, the recovering interconnect node waits for a certain time-out period before starting to forward flooded packets, at a time-out step 102. The time-out period (which is typically provisioned by the operator) allows the other interconnect node to transition from forwarding all packets to selective forwarding, without risking frame duplication. This mechanism also allows transiting packets that were forwarded between rings by the protecting interconnect node to clear the ring without being duplicated. Although the time-out period may cause temporary packet loss, this loss is often tolerable and is preferred over frame duplication. Following the time-out period, the method returns to normal operation, at step 70 above.

The description of FIG. 3 is meant to demonstrate several exemplary failure and failure recovery scenarios, and the operation of the interconnect nodes under these scenarios. In alternative embodiments, the interconnect nodes may apply any other suitable mechanism in order to operate under other sorts of failure or failure recovery scenarios.

Interconnect Node Operational States

In some embodiments, the stations of the interconnect nodes support different operational states in order to operate under various failure and failure recovery scenarios. For example, in some embodiments each station 22 of a given interconnect node 32 may alternate among different operational states, such as:

1. A forced switch state, in which the station is deliberately disabled by an operator, such as for maintenance or reconfiguration. If failure occurs when the station is in this state, the station remains in the state irrespective of possible traffic loss.
2. A failure state, in which the station's interface with its peer station or with the ring has a failure or is misconfigured.
3. A Wait To Restore (WTR) state, in which the station has recently recovered from failure but waits for a predefined time-out period before resuming normal operation, in order to de-bounce unwanted toggling in and out of failure state.
4. A peer down state, in which the peer station does not forward packets due to a certain failure condition.
5. A protecting state, in which the mate station does not forward packets.
6. A manual switch state, in which the station is deliberately disabled by an operator, such as for maintenance or reconfiguration. Unlike the forced switch state above, if failure occurs when the station is in the manual switch state, the station overrides the disabling command and begins to forward packets in order to prevent traffic loss.
7. A back-off state, which is initiated after a station of an interconnect node did not forward packets between the rings (due to failure or operator command). During this state the station waits for a predefined time-out period before resuming functionality of ring interconnect. This mechanism prevents frame duplication.
8. A no request state, in which the station operates normally. No protection is requested and no failure is detected.

Typically, each station of a given interconnect node supports a command interface comprising various configuration commands. The commands may comprise, for example, an idle command requesting the station to switch to the no request state, a manual switch command requesting a switch to the manual switch state, and a forced switch command requesting a switch to the forced switch state. In addition to the external commands, each station of an interconnect node communicates with its peer and mate(s), and determines its operational state based on the status of the peer and mate(s) and on the external commands.

Peer stations of a given interconnect node may exchange synchronization messages that are also used as "keep alive"

indications. The synchronization messages between peer stations may indicate the status of the station ("station OK") as well as its operational state. Messages between peers may be sent periodically, following a state change, or both. Mate stations of a given protection group in a given ring may also exchange synchronization messages that are used as "keep alive" indications, either periodically or in response to a state change. Exemplary synchronization messages and associated state machines are described by Ram in "Protected Inter-Ring Connection," cited above.

In some embodiments, each interconnect node may alternate among three forwarding states:

1. A "forward mine" state in which the node forwards the packets selectively based on the mapping function.
2. A "forward none" state in which the node does not forward any packets, such as because of failure or when the node is deliberately disabled for maintenance or reconfiguration.
3. A "forward all" state in which the node forwards all packets, such as when the other interconnect node does not forward packets.

Interconnect Node Forwarding Rules

Each interconnect node typically makes forwarding decisions based on a predefined set of rules. In the description that follows, the set of rules is written in tabular representation. Each row comprises a Boolean condition and an associated action. The table is traversed in ascending order of the rows. In each row, the condition is evaluated. If the condition evaluates to TRUE, the corresponding action is performed and execution terminates. If the condition evaluates to FALSE, execution advances to the next row.

In the present example, a certain set of rules applies to packet forwarding from the client (the L2 bridge) of the node to the RPR MAC (the ring station). A different set of rules applies to forwarding in the opposite direction, i.e., from the RPR MAC to the L2 bridge.

The forwarding rules from the L2 bridge to the RPR MAC are defined by the following table:

| Row | Condition | Action |
|---|---|---|
| 1 | Unicast(frame) | Forward |
| 2 | MAC is on primary ring | Forward |
| 3 | FwdState==FwdNone | Discard |
| 4 | FwdState==FwdAll | Forward |
| 5 | myFlow(frame) | Forward |
| 6 | — | Discard |

As can be seen from the table, if the frame is a unicast frame, it is forwarded regardless of any other conditions. Otherwise, the node checks whether the RPR MAC in question is on the primary ring. If so, the frame is forwarded to the MAC. Otherwise, the node checks whether the node is currently in the "forward none" forwarding state. If so, the frame is discarded. Otherwise, the node checks whether the node is currently in the "forward all" forwarding state. If so, the frame is forwarded. Otherwise, the node evaluates the mapping function (denoted myFlow in the table) based on the frame attributes. If the mapping function returns a TRUE value, the frame is forwarded. Otherwise, the frame is discarded.

The forwarding rules from the RPR MAC to the L2 bridge are defined by the following table:

| Row | Condition | Action |
|---|---|---|
| 1 | Unicast(frame) | Forward |
| 2 | (MAC is on primary ring) && (RPR SA is the mate MAC address) && (FwdState==FwdAll) | Discard |
| 3 | MAC is on primary ring | Forward |
| 4 | RPR SA is the mate MAC address | Discard |
| 5 | FwdState==FwdNone | Discard |
| 6 | FwdState==FwdAll | Forward |
| 7 | myFlow(frame) | Forward |
| 8 | — | Discard |

Following this set of rules, if the frame is a unicast frame, it is forwarded to the L2 bridge irrespective of other conditions. Otherwise, the node checks whether the RPR MAC is on the primary ring, the RPR source address is the MAC address of the mate station (i.e., the frame originates from the other interconnect node on the same ring), and whether the node is currently in the "forward all" forwarding state. If all three conditions are met, the frame is discarded. Otherwise, the node checks whether the RPR MAC from which the packet is to be forwarded is on the primary ring. If so, the packet is forwarded. Otherwise, the node checks whether the RPR source address of the frame is the MAC address of the mate station. If so, the frame is discarded. Otherwise, the node checks whether the node is currently in the "forward none" forwarding state. If so, the frame is discarded. Otherwise, the node checks whether the node is currently in the "forward all" forwarding state. If so, the frame is forwarded. Otherwise, the node evaluates the mapping function myFlow based on the frame attributes. If the mapping function returns a TRUE value, the frame is forwarded. Otherwise, the frame is discarded.

In particular, the sets of rules described above enable loop-free forwarding of frames that originate from or are destined to local CTPs (i.e., user nodes that are connected locally to an interconnect node and not to any of the rings). As can be seen in the tables, an interconnect node will discard a frame received from the secondary ring if all the following conditions are met:

1. Interconnection is fully functional (the mate stations are visible on their respective rings and the interconnection functionality in both interconnect nodes functions properly).
2. The frame was sent from the mate station of the other interconnect node (the RPR source address is equal to the MAC address of the mate station).
3. The frame was flooded by the mate station of the other interconnect node.

Additional aspects of communicating over interconnected ring networks are addressed by Ram in "Protected Inter-Ring Connection," cited above. Certain aspects of communicating over interconnected ring networks are also addressed in U.S. patent application Ser. No. 11/764,764, entitled "MAC Address Scalability in Interconnected Rings," filed Jun. 18, 2007, whose disclosure is incorporated herein by reference.

Although the embodiments described herein mainly address prevention of frame duplication in RPR networks, the principles of the present invention can also be used in other network types and applications, such as for interconnecting rings of Ethernet Bridges or for generally interconnecting a chain of network elements (which can be modeled as an "open ring").

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A method for communication, comprising:
in a communication network that includes multiple ring nodes arranged in at least first and second ring networks, which are connected by two or more of the ring nodes serving as interconnect nodes, accepting at the two or more interconnect nodes respective copies of a data packet, which is sent from a source user node connected to the first ring network;
extracting an attribute from the respective copies of the data packet at each of the interconnect nodes, and applying a predefined mapping function to the extracted attribute so as to select a single interconnect node for forwarding the data packet to the second ring network;
sending, by each interconnect node, a synchronization message indicating the status thereof;
receiving, by each interconnect node, the synchronization messages of the other interconnect nodes;
responsively to the receiving the synchronization messages, assigning to each interconnect node a respective forwarding status selected from a group consisting of:
"forward mine";
"forward none"; and
"forward all"; and
for an iterated interconnect node of the interconnect nodes:
if the iterated interconnect node has a "forward mine" forwarding status, then forwarding a single copy of the data packet to the second ring network only if the iterated interconnect node is the selected interconnect node, while refraining from forwarding a copy of the data packet if the iterated interconnect node is not the selected interconnect node;
if the iterated interconnect node has a "forward none" forwarding status, then refraining from forwarding a copy of the data packet regardless of the predefined mapping function and the selected interconnect node; and
if the iterated interconnect node has a "forward all" forwarding status, then forwarding a singled copy of the data packet to the second ring network regardless of the predefined mapping function and the selected interconnect node.

2. The method according to claim 1, wherein the first and second ring networks conform to a Resilient Packet Ring (RPR) standard.

3. The method according to claim 1, wherein the data packet comprises a flooded packet, and wherein forwarding the single copy to the second ring network comprises causing the ring nodes of the second ring network to flood the data packet over the second ring network.

4. The method according to claim 1, wherein the data packet comprises a ring-level destination address indicating that the data packet is addressed to multiple recipients.

5. The method according to claim 1, wherein the attribute comprises a Virtual Local Area Network (VLAN) identifier.

6. The method according to claim 1, wherein the attribute comprises a Quality-of-Service (QoS) attribute.

7. The method according to claim 1, wherein the mapping function comprises a hashing function.

8. The method according to claim 1, wherein the mapping function and the attribute are defined such that a first data packet originating from a first end user and destined to a second end user and a second data packet originating from the second end user and destined to the first end user are forwarded by the same interconnect node.

9. The method according to claim 1, wherein the mapping function and the attribute are defined such that data packets associated with a given conversation are forwarded by the same interconnect node.

10. The method according to claim 1, and comprising forwarding the respective copy of the data packet from a first interconnect node irrespective of the mapping function responsively to an event that prevents a second interconnect node from forwarding the copy.

11. The method according to claim 10, and comprising, responsively to a recovery of the second interconnect node from the event, re-initiating forwarding of copies from the first interconnect node in accordance with the mapping function.

12. The method according to claim 11, and comprising exchanging communication messages between the first and second interconnect nodes so as to detect the event and the recovery.

13. The method according to claim 11, and comprising waiting a predetermined time-out period following the recovery before re-initiating forwarding of the copies in accordance with the mapping function.

14. The method according to claim 1, and comprising detecting by the interconnect nodes a topology change in the first ring network, and notifying the topology change to the ring nodes in the second ring network by the interconnect nodes.

15. The method according to claim 1, and comprising operating each node among the interconnect nodes in one of multiple forwarding states comprising at least a first state in which the node forwards data packets selectively in accordance with the mapping function, a second state in which the node forwards the data packets irrespective of the mapping function, and a third state in which the node refrains from forwarding the data packets.

16. The method according to claim 15, wherein operating the node comprises applying a set of rules, which depend on the forwarding states, to the accepted copy of the data packet so as to determine whether to forward the copy.

17. The method according to claim 1, and comprising refraining from forwarding the accepted copy from a given interconnect node responsively to determining that the data packet originates from a local user node, which is locally-connected to another interconnect node and is not connected to the first or second ring networks.

18. A communication apparatus used in a communication network that includes multiple ring nodes arranged in at least first and second ring networks, the apparatus comprising two or more interconnect nodes that connect the first and second ring networks, wherein each interconnect node is configured:
to send a synchronization message indicating the status thereof;
to receive the synchronization messages of the other interconnect nodes;
responsively to receiving the synchronization messages, taking on a forwarding status selected from a group consisting of:
"forward mine";
"forward none"; and
"forward all"; and to accept a data packet, which is sent from a source user node connected to the first ring network;

to extract an attribute from the data packet;

to apply a predefined mapping function to the extracted attribute so as to select a single interconnect node for forwarding the data packet to the second ring network; and if the interconnect node has a "forward mine" forwarding status, to forward a single copy of the data packet to the second ring network only if the interconnect node is the selected interconnect node, while refraining from forwarding a copy of the data packet if the interconnect node is not the selected interconnect node;

if the interconnect node has a "forward none" forwarding status, then refraining from forwarding a copy of the data packet regardless of the predefined mapping function and the selected interconnect node; and if the interconnect node has a "forward all" forwarding status, then forwarding a singled copy of the data packet to the second ring network regardless of the predefined mapping function and the selected interconnect node.

19. The apparatus according to claim 18, wherein the first and second ring networks conform to a Resilient Packet Ring (RPR) standard.

20. The apparatus according to claim 18, wherein the data packet comprises a flooded packet, and wherein the ring nodes are configured to forward the single copy to the second ring network so as to cause the ring nodes of the second ring network to flood the data packet over the second ring network.

21. The apparatus according to claim 18, wherein the data packet comprises a ring-level destination address indicating that the data packet is addressed to multiple recipients.

22. The apparatus according to claim 18, wherein the attribute comprises a Virtual Local Area Network (VLAN) identifier.

23. The apparatus according to claim 18, wherein the attribute comprises a Quality-of-Service (QoS) attribute.

24. The apparatus according to claim 18, wherein the mapping function comprises a hashing function.

25. The apparatus according to claim 18, wherein the mapping function and the attribute are defined such that a first data packet originating from a first end user and destined to a second end user and a second data packet originating from the second end user and destined to the first end user are forwarded by the same interconnect node.

26. The apparatus according to claim 18, wherein the mapping function and the attribute are defined such that data packets associated with a given conversation are forwarded by the same interconnect node.

27. The apparatus according to claim 18, wherein a first interconnect node is configured to forward the respective copy of the data packet irrespective of the mapping function responsively to an event that prevents a second interconnect node from forwarding the accepted copy.

28. The apparatus according to claim 27, wherein the first interconnect node is configured to re-initiate forwarding of copies in accordance with on the mapping function responsively to a recovery of the second interconnect node from the event.

29. The apparatus according to claim 28, wherein the first and second interconnect nodes are configured to exchange communication messages so as to detect the event and the recovery.

30. The apparatus according to claim 28, wherein the first interconnect nodes is configured to wait a predetermined time-out period following the recovery before re-initiating forwarding of the copies in accordance with the mapping function.

31. The apparatus according to claim 18, wherein the interconnect nodes are configured to detect a topology change in the first ring network, and to notify the ring nodes in the second ring network of the topology change.

32. The apparatus according to claim 18, wherein each node among the interconnect nodes is configured to operate in one of multiple forwarding states comprising at least a first state in which the node forwards data packets selectively in accordance with the mapping function, a second state in which the node forwards the data packets irrespective of the mapping function, and a third state in which the node refrains from forwarding the data packets.

33. The apparatus according to claim 32, wherein the node is configured to apply a set of rules, which depend on the forwarding states, to the accepted copy of the data packet so as to determine whether to forward the copy.

34. The apparatus according to claim 18, wherein each interconnect node is configured to refrain from forwarding the accepted copy responsively to determining that the data packet originates from a local user node, which is locally-connected to another interconnect node and is not connected to the first or second ring networks.

35. A communication network comprising multiple ring nodes arranged in at least first and second ring networks, the multiple ring nodes comprising two or more interconnect nodes that connect the first and second ring networks, wherein each interconnect node is configured:

to send a synchronization message indicating the status thereof;

to receive the synchronization messages of the other interconnect nodes;

responsively to receiving the synchronization messages, taking on a forwarding status selected from a group consisting of:
"forward mine";
"forward none"; and
"forward all"; and to accept a data packet, which is sent from a source user node connected to the first ring network;

to extract an attribute from the data packet;

to apply a predefined mapping function to the extracted attribute so as to select a single interconnect node for forwarding the data packet to the second ring network; and if the interconnect node has a "forward mine" forwarding status, to forward a single copy of the data packet to the second ring network only if the interconnect node is the selected interconnect node, while refraining from forwarding a copy of the data packet if the interconnect node is not the selected interconnect node;

if the interconnect node has a "forward none" forwarding status, then refraining from forwarding a copy of the data packet regardless of the predefined mapping function and the selected interconnect node; and if the interconnect node has a "forward all" forwarding status, then forwarding a singled copy of the data packet to the second ring network regardless of the predefined mapping function and the selected interconnect node.

* * * * *